March 3, 1953  J. F. KAHLENBERG ET AL  2,629,970
AMPOULE SEALING MACHINE
Filed April 16, 1951  2 SHEETS—SHEET 1
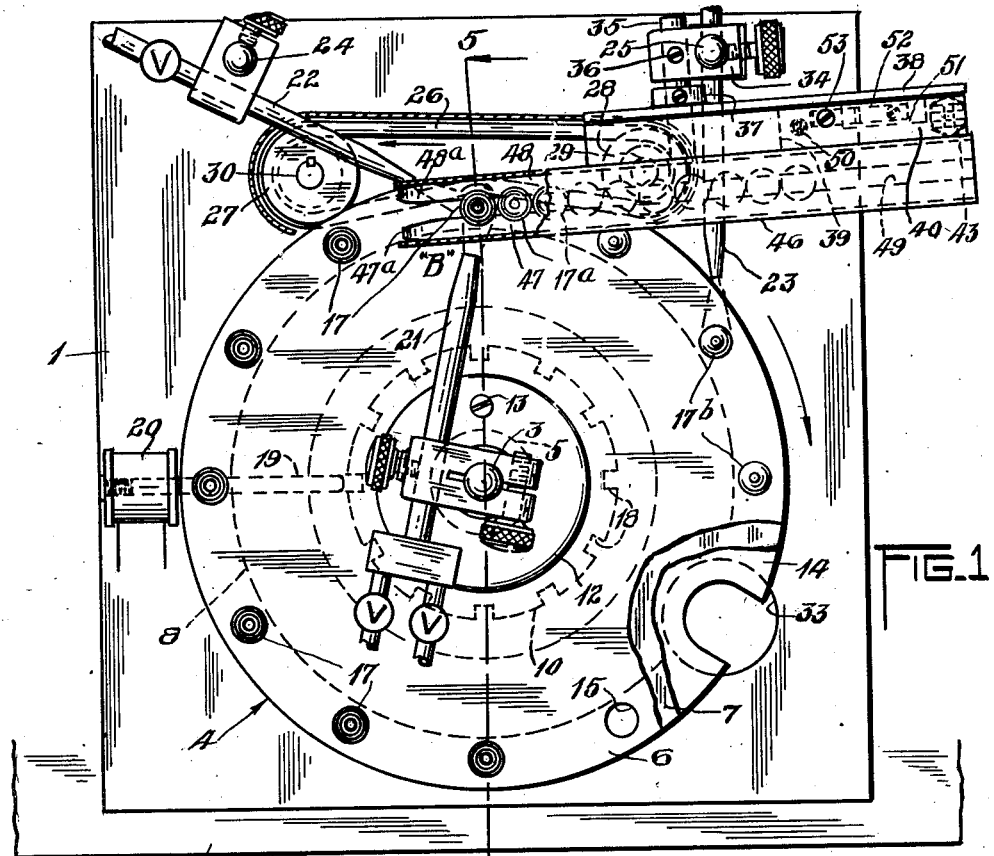
INVENTORS.
James F. Kahlenberg
Herman H. Kahlenberg
By Sands Calhoun
ATTORNEY March 3, 1953  J. F. KAHLENBERG ET AL  2,629,970
AMPOULE SEALING MACHINE
Filed April 16, 1951  2 SHEETS—SHEET 2
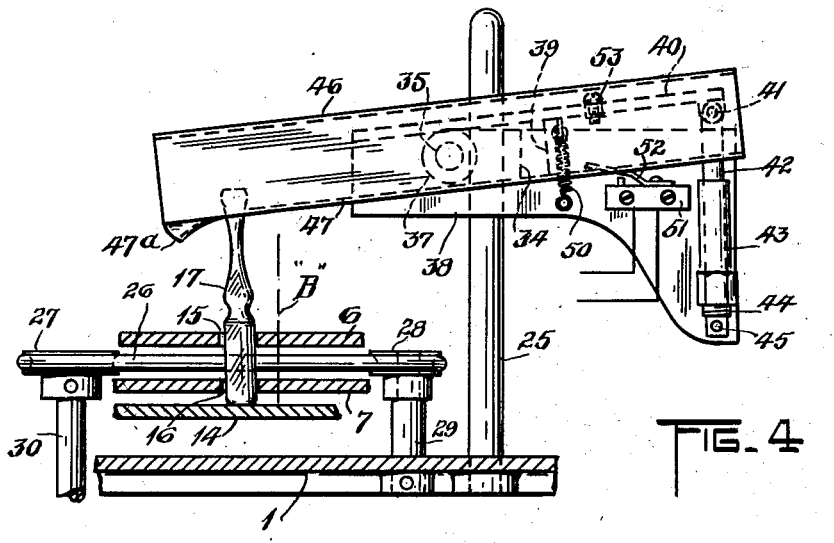
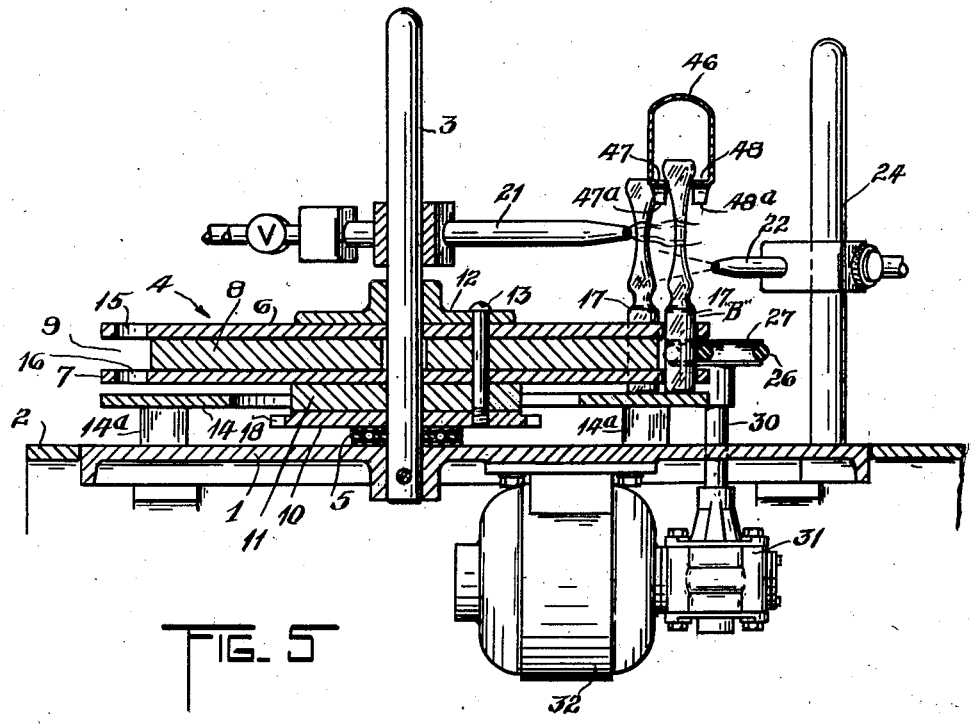
INVENTORS:
James F. Kahlenberg
Herman H. Kahlenberg
By Sands Calhoun
ATTORNEY Patented Mar. 3, 1953

2,629,970

UNITED STATES PATENT OFFICE 2,629,970

AMPOULE SEALING MACHINE

James F. Kahlenberg and Herman H. Kahlenberg, Sarasota, Fla.

Application April 16, 1951, Serial No. 221,194

8 Claims. (Cl. 49—7)

The present invention relates broadly to the sealing of glass tubing by the application of heat, and more particularly to the sealing of ampoules and like containers in which a comparatively long, slenderized neck extends axially of the container body and is flared at its tip end to provide an enlarged funnel-shaped mouth. These ampoules are available on the open market under various trade names. Still more specifically, the invention pertains to an attachment designed primarily for use on a machine for sealing ampoules and the like, a prior invention of ours for which United States Patent No. 2,493,070 was issued January 3, 1950, the purpose of such attachment being to make the machine more automatic in operation, to increase production and reduce spoilage to a minimum.

Unlike automatic sealing machines now on the market and in which the sealing and tip removal operation is accomplished in a fixed time interval, the present invention provides a variation in the time interval which automatically compensates for differences in time necessary to melt the glass during the sealing and tip removal operation. This is accomplished through the elimination of cams, gearing and like positive drives and by simple mechanism, later to be described, which employs successive work pieces moving into a heating zone as both a slip clutch for rotating the work carrier when its indexing mechanism is unlocked, and as a means for actuating a tip removing device for variably determining the time interval during which the sealing operation is performed. Thus, during operation, the machine will automatically compensate for difference in the amount of time necessary to seal ampoules, tubes and the like differing in structure and, for one work piece or another, the variable determining the time interval for successive feeding will be the thickness and other characteristics of the glass at the point of sealing and intensity of heat to which the glass is subjected. In no instance will the carrier be automatically released for further feeding until a seal has been formed and there is a severance of the glass at the point of sealing. This is a further and important object of the invention.

Briefly described, the machine disclosed in our Patent No. 2,493,070 of references comprises a turret mounted to freely rotate about a vertical axis but having no direct driving connection. The turret is provided, adjacent its periphery, with a plurality of upwardly opening, circumferentially spaced pockets for removably supporting ampoules or like filled or partly filled containers, one in each pocket and free to revolve about its own axis irrespective of whether the turret is in motion or not.

Indexing and locking means are provided whereby the turret is intermittently rotated to successively feed the ampoules to a heating station where the area of the neck portion, at which the seal is to be made, is subjected to the intense heat of a gas burning torch, the turret being locked against rotation during the brief time period required for softening the glass to a pliable and fusible consistency, severing the tip end of the ampoule and forming the seal. During this period an air jet, directed against the work piece at a lower lever, restricts the excessive heating to a defined area and maintains such temperature conditions of the ampoule body as will restrain its contents from overheating, vaporizing, forming glass bubbles and rejects. Then, as the succeeding ampoule is moved into the heating zone, and the sealed one advanced toward an unloading station, the seal and surrounding area of the latter are subjected to the cooling and hardening influence of another air jet.

As an ampoule approaches and leaves the heating station, and during the heating period, it is continuously rotated by the engagement of a motor driven friction belt with its peripheral surface. This frictional contact becomes the leverage and the ampoule the connecting medium through which force is exerted to rotate the turret when the lock is released.

In the machine, as first above described, the tip end of the tubular member being sealed, that is the flared or funnel shaped mouth portion above the area of molten glass, was heretofore manually removed by gripping it with a forceps or other suitable instrument and exerting either an upward pull, or allowing the tip to twist off by holding it against rotation. And, the intermittent feed of the turret was under manual control.

With the present invention removal of the tip end of the work pieces above the seal is an automatic operation, and one of the main objects is to accomplish this by simple, effective, positively operating and inexpensive mechanism which includes a device for drawing off the tip of the ampoule, or the like being sealed, such device being brought into operative position and under spring tension by the member to be sealed as it moves into the heating zone. In this arrangement, the ampoule or tube at the heating station not only becomes the link in the mechanism which actuates the tip removing device but, by contrast, the failure of an ampoule or tube to present itself for sealing will render the removal device immobile and the machine will come to a stop and cease its operation.

Another object of the invention is to remove the tip while the ampoule is being rotated in the flame, the result being the formation of a perfectly symmetrical seal.

The tip removal member constitutes a slide pivoted at its center to allow rotation in a vertical plane, and having a longitudinally extending open trackway the sides of which at their forward ends are bent down to provide cam surfaces for engagement beneath the flared mouth of the ampoule, a further object of the invention being to employ the trackway as a means along which the removed tips are intermittently fed until they drop off its discharge end, each succeeding tip as it enters the trackway being the propelling means for such movement of the wastage. The cam surfaces at the entrance end of the trackway are so formed that as the ampoule advances to the sealing position, and being engaged in the trackway as it moves in a horizontal plane toward the fulcrum of the slide, which is in a higher horizontal plane than the point where the ampoule is engaged by the slide, a lever action is introduced between the point of contact of the ampoule with the slide and the fulcrum and the slide being free to move only down in a vertical plane, it is so pulled down as the ampoule advances.

The accompanying drawings illustrate the invention as embodied in a machine constructed and operating in the manner hereinabove described, and covered by the patent of reference, are as follows:

Fig. 1 is a plan view of the invention and the machine to which it is attached.

Fig. 2 is a view in front elevation of the parts seen in Fig. 1, but showing only fragmentary portions of the machine proper in vertical section, and an ampoule in the position in which it is about to engage the tip remover.

Fig. 3 is a sectional view on line 3—3 of Fig. 2.

Fig. 4 is a view similar to Fig. 2 but with the ampoule engaged by the tip remover and in proximity to the heating station.

Fig. 5 is a section view of the machine taken on line 5—5, Fig. 1.

In the drawings similar reference numerals refer to similar parts throughout the different views.

The illustrated machine is a portable one of unitary construction and mounted upon a base plate 1 supported within an opening therefor in a table top 2. Upstanding from the base 1 is a shaft 3 on which a turret or carrier, indicated generally by numeral 4, is free to revolve, a thrust bearing 5 being interposed between the turret and the base. The turret 4 includes an upper disc 6 and a similar lower disc 7, preferably of Bakelite or like material, spaced apart by a disc 8 of less diameter than the members 6 and 7 so as to provide an outwardly opening annular channel 9 between them. Interposed between the underside of disc 7 and a combination indexing and locking plate 10 is a second spacer 11 of still less diameter than the first named spacer 8. There is a hub 12 on the top of disc 6 and the several parts are clamped together by suitable fastening means such as tie-bolts 13, only one of which is shown. Surrounding the spacer 11 is a ring 14 the outer diameter of which is substantially that of the discs 6 and 7. This ring 14 is a fixed member and is shown supported upon bosses 14a upstanding from the base 1. It is of less thickness than the spacer 11 in order to provide clearance both under disc 7 and above locking plate 10.

Adjacent the periphery of disc 6, in the area above channel 9, are a plurality of regularly circumferentially spaced circular openings 15. These apertures 15 with substantially opposite like openings 16 in the lower disc 7 provide the recesses or pockets for removably receiving the work pieces which in this instance are shown as ampoules 17. The ampoules, one in each pocket, stand upon the ring member 14 and slide thereover as the turret rotates. The lower openings 16 are not in true axial alignment with corresponding upper openings 15 but are advanced circumferentially a slight degree so that the ampoules 17 will incline slightly from the vertical, as shown, and for the purpose to be described.

The peripheral edge of plate 10 is slotted to provide notches 18 of like number and angular spacing as the holes 15 and 16, and when engaged by a spring actuated sliding bar 19 the turret is locked against rotation. Originally this bar was manually retracted, but in the instant invention it constitutes the plunger of a solenoid magnet 20 and is retracted to unlock the turret when the solenoid is energized by the automatic closing of a switch, as the ampoule tip is removed.

The ampoule 17 in position for sealing is at a heating station, indicated at "B" in Figs. 1 and 4, where the neck portion at which the seal is to be made is subjected to intense heat by a flame directed against it from a gas burner 21 which, in this instance, is adjustably supported on the shaft or post 3 about which the turret revolves. The first and second air jets, hereinabove mentioned and their purpose described, are directed from nozzles 22 and 23, respectively, adjustably supported on post 24, for the nozzle 22, and 25, for the nozzle 23, both upstanding from the base 1.

As an ampoule 17 approaches heating station "B" the peripheral surface of its body portion is frictionally engaged by the inner reach of a belt 26 preferably round in cross section. This belt 26 engages over a driving pulley 27 and an idler 28, one each side of the heating station "B" and lying in a horizontal plane intermediate the two turret discs 6 and 7. The idle pulley 28 is loosely mounted on a stub shaft 29 while the driving pulley 27 is splined to a shaft 30 which, through reduction gearing in a gear box 31, is driven by an electric motor 32 supported upon the underside of base plate 1.

With the turret 4 loaded and the machine in operation, at least one ampoule 17 is engaged and caused to revolve about its own axis by the belt 26. This occurs as the ampoule moves into and leaves the heating zone and during the momentary time period when the turret is locked against rotation and the seal is being formed. Frictional engagement of the belt 26 also exerts a forward push against the ampoule 17 in the direction of the belt's travel so that the ampoule, functioning as a slip clutch, becomes the connecting medium through which, with the lock bar 19 disengaged from the plate 10, the turret is given its intermittent rotation to successively feed the ampoules to the heating station. The sealed ampoules, indicated in Fig. 1 at 17b, are either removed from their pockets by hand or allowed to drop onto a delivery chute, not shown, through an opening 33 in the supporting ring 14.

Any tendency of the ampoules to "ride" the belt 26, and thus be lifted out of their pockets, is overcome by their slight inclination from the vertical which is produced by the respective off-setting of the pocket forming holes 15 and 16 so that, while being rotated, the top of the ampoule is tilted in the opposite direction from the thrust imparted by the belt. In this tilted position the ampoule engages the leading edge portions of the upper and lower openings 15 and 16 in such manner that the belt 26 exerts a downward push on the ampoule rather than an upward thrust. This is an important feature in the successful operation of mechanism embodied in the present invention and now to be described.

Also adjustably secured to the post 25 is a clamping fixture 34 having a bore for receiving a horizontally extending stub shaft 35 held therein at any position of axial and rotary adjustment by set screw 36. Supported on stub shaft 35 and by a collar 37 is a stationary bracket plate 38 which lies in a vertical plane. Adjacent the face of plate 38 toward the turret 4 is a bearing block 39 mounted for rocking movement on the forward end of stub shaft 35. Integral with block 39 and extending transversely of stub shaft 35, to the right with respect to Figs. 1, 2 and 4 of the drawings, is an arm 40 which at its outer end has pivotal connection 41 with the free, upper end of the plunger 42 of a dashpot 43. The latter is provided with a standard ball check valve 44 and at its lower end is pivotally supported upon a pin 45 extending laterally from bracket plate 38.

Secured to the outer face of block 39 by brazing or otherwise is what we term a slide 46 and along which travel the tips 17a as wastage from sealed tubing. This slide 46 is in the form of an open ended housing extending in a line substantially tangential to the circular path of travel of the ampoules at the heating station "B," its ends being practically equidistant from the fulcrum point of the rocker member 39. The housing 46 is shown as formed of sheet metal with the side walls turned inwardly along their bottom edges to form opposing flanges 47, 48 spaced apart to provide a longitudinally extending slot or track way 49 for the wastage tips 17a. The flanges 47 and 48 are shaped at their forward ends to receive the neck of an ampoule 17 into the slot 49 as the ampoule approaches heating station "B" and are bent downward to provide lips 47a and 48a adapted to engage under the enlarged upper or mouth end of the tube to be sealed, this enlargement being a flaring of the tube, as illustrated, or a shoulder accordingly as the article to be sealed is an ampoule, tubing or other type of container.

When the lips 47a and 48a engage an ampoule 17, or like article, the slide 46 is in its upper or substantially horizontal position, as seen in Figs. 2 and 3, in which it is normally held by a coiled tension spring 50 anchored at one end to the arm 40 and at its other end to bracket 38. The stub shaft 35 is in a higher horizontal plane than the point of contact between the ampoule and the slide. Thus the normal tendency of the ampoule advancing to sealing position "B" would be to ride upward on the cam surface formed by the lip 47a and 48a and also upward toward the horizontal plane of stub shaft 35. However, the downward pull on the ampoule by the friction belt 26 overcomes action of the spring 50 and the member 46 is pulled down to the angular position shown in Fig. 4, the slot 49 being sufficiently wide to permit continued rotation of the ampoule without binding. With slide 46 in its down position the ampoule reaches the heating station "B" and, as the glass becomes molten this member 46, functioning as a lever under tension of spring 50, stretches the more or less fluid glass, see Fig. 5, and resumes its normal position as in Figs. 2, 3 and 5. In doing so it removes the tip end 17a.

Also mounted on bracket plate 38 is a microswitch 51 having a spring contact arm 52. This arm 52, when the slide 46 and parts 39 and 40 movable therewith are in upper or substantially horizontal position, Fig. 2, is forced down into closed position by a screw 53 adjustable in the arm 40. A circuit is thus closed which energizes the solenoid coil 20 and disengages the locking bar 19 from the indexing plate 10. The turret then rotates under influence of the belt 26 on the ampoule 17; the tip removing member is again ready to engage the next ampoule approaching the heating station and as the next ampoule enters the slide 46 and pulls it down as hereinabove described, switch arm 52 breaks contact to de-energize coil 20 and allow the spring pressed plunger arm 19 to again lock the turret when the ampoule reaches the heating station, such ampoule having pushed the removed tips 17a another step along the trackway 49.

When the glass becomes softened and the tip 12a is raised by the removal mechanism, a very fine capillary tube of molten glass is drawn out and forms a connection between the wastage and the ampoule. It is necessary to melt this capillary tube to complete the seal, and, therefore, the ampoule being sealed must be held in the flame a sufficient length of time for this thread-like tube to melt off. This can be accomplished by delaying return of the slide 46 to the position where it closes the main switch 51 or by placing a time delay relay in the circuit between the switch and the solenoid 20. To accomplish this delay we make use of the dashpot 43 which opposes action of the spring 50. The dashpot can be adjusted, by metering out the escaping air, to allow the exact amount of time reuired to melt the capillary tube before switch 51 is closed and the sealed ampoule is carried from the sealing position.

From the foregoing it will be observed that we have provided means whereby the very simple machine of our prior invention, in which there are but few parts and without any direct drive for the turret, has been made fully automatic in its operation; that successive ampoules or like workpieces, as they move into position for sealing, not only constitute a connecting medium through which the turret is rotated by the friction belt which rotates the ampoules about their own axes, thus providing a slip clutch which allows a variable time period for making the seal without effecting indexing of the turret, but they function as the means for moving the tip removal mechanism into operative position; and, that they are the means for progressively feeding the wastage along its removal mechanism to a place of discharge.

In other words, we have provided a device for removing the tips of ampoules and thus sealing them that is not operated at a cyclic fixed time interval for heating the ampoules to proper fuzing temperature, by providing resilient axial tension between two points on the ampoule and applying a heating flame intermediate thereto and providing a holding means for maintaining said tension and holding in the flame until such time as the heating means melts the glass ampoule and thus removing said tension, which in turn releases said holding means. The amount of time that the ampoule will remain in the flame is determined by melting characteristics of the particular ampoule being sealed. The ampoule will thus remain in the flame the exact time necessary for melting the glass and no more and no less.

The time-delay interval interposed to allow the capillary tube to melt off must be provided but this does not start to function until the tube is heated to pliable consistency. The delay functions to allow the fraction of a second necessary to heat the glass from the temperature at which it becomes pliable to the temperature at which it becomes fusible and the tip separates from the body.

The ampoule is rotated to provide uniform heating around its circumference so that the end of the ampoule or tube being sealed has a uniform appearance and is free from internal stress due to uneven heating.

It may also be stated that the drawings are for the purpose of illustration only and that various changes in construction, operation and positions of mounting various parts may be made without departing from the spirit and scope of the invention as recited in the appended claims.

We claim:

1. In a machine for sealing ampoules and like tubular containers in which the tip or filling end is of greater diameter than the neck portion, heating means for making the seal, a carrier having pockets for removably supporting said containers on end and for successively moving them to and from said heating means, a pivotally mounted bifurcated arm in the path of a container as it approaches said heating means, and resilient means for normally holding said arm in the plane of the enlarged tip end of the container, said arm being engaged by said enlarged end and pulled down thereby against the action of said resilient means as the container moves toward the pivot of the arm, said pivot being in a higher plane than the point of engagement of the enlarged end in the arm, the said resilient means returning said arm to normal position and thus separating the tip end from the container when the heated area of the container is in a state of pliable and fusible consistency.

2. A sealing machine in accordance with claim 1 but characterized by said bifurcated arm providing a trackway on which the removed tips are slidably supported and progressively fed toward a discharge point by successive containers as they engage said arm.

3. A sealing machine according to claim 1 and including an adjustable dash-pot actuated by said arm and opposing the action of said resilient means for adjustably retarding return of said arm to normal position while the tip is being separated from the container.

4. A sealing machine according to claim 1 and including a friction belt, said belt functioning to engage and rotate each container during the heating period and comprising means exerting an axial pull on the containers as opposed to the upward pull of said bifurcated arm.

5. The combination, in a machine for sealing ampoules, of a turret mounted to rotate about a vertical axis and having a plurality of ampoule receiving pockets regularly spaced in a circle adjacent its periphery, heating means, means for rotating said turret, indexing mechanism including a spring actuated locking bar for intermittently holding said turret against rotation as successive ampoules are in position for sealing, a solenoid for releasing said locking bar, a bifurcated arm fulcrumed intermediate its ends and arranged in the path of the ampoules as they approach said heating means, and resilient means for normally holding said arm in an up position, said arm engaging each successive ampoule and being pulled thereby to a down position against the action of said resilient means, the latter returning said arm to its up position and thus separating the tip end from the ampoule when the heater area thereof is in a state of pliable and fusible consistency, said solenoid being energized when said arm is in its up position to release said locking bar and allowing said turret to rotate, and said bifurcated arm providing a trackway for supporting the removed ampoule tip and along which such wastage is progressively moved by and as successive ampoules are engaged by the arm.

6. An ampoule sealing machine according to claim 5 and including a means for regulating the time interval between the time the glass starts to melt and the time the container is removed from the heating means.

7. The combination, in a machine for sealing ampoules, of heating means, a carrier for successively moving the ampoules in a vertical position to and from said heating means, and means for removing the tip ends or wastage from the ampoules comprising a lever fulcrumed intermediate its ends and including a bottom wall having an open ended longitudinal slot providing a trackway for the wastage, spring means for normally holding the forward end of said lever in an up position, lips on the forward end of said lever for engaging the flared tip ends of the ampoules and directing them into said slot as the ampoules approach said heating means, the lever being swung to a down position by the engaged ampoule against the action of said spring and returned by said spring to its up position as the seal is formed and the tip end melted off.

8. In a sealing machine, a combination in accordance with claim 7 and including an electric switch controlled by the movement of said lever which closes an electric circuit energizing a solenoid and said solenoid actuates a locking bar to unlock the rotary turret so that it is free to rotate when the arm is in normal or up position, and conversely said switch to break the electric circuit to deenergize solenoid immediately upon said arm being pulled down from normal position, which allows said locking bar, which is spring loaded against the action of said solenoid to seek and engage the indexing slot in the locking plate, thus stopping the movement of the rotary turret when the ampoule is in sealing position.

JAMES F. KAHLENBERG.
HERMAN H. KAHLENBERG.

REFERENCES CITED

The following references are of record in the file of this patent:

UNITED STATES PATENTS

| Number | Name | Date |
|---|---|---|
| 2,270,152 | Themak | Jan. 13, 1942 |